(12) United States Patent
Chun

(10) Patent No.: US 7,603,024 B1
(45) Date of Patent: Oct. 13, 2009

(54) APPARATUS FOR STORING AND SEARCHING AUDIO/VIDEO DATA CONTAINING ADDITIONAL INFORMATION

(75) Inventor: Kang-Wook Chun, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1231 days.

(21) Appl. No.: 09/706,814

(22) Filed: Nov. 7, 2000

(30) Foreign Application Priority Data

Nov. 20, 1999 (KR) ............................... 1999-51711

(51) Int. Cl.
*H04N 5/91* (2006.01)
*H04N 7/12* (2006.01)

(52) U.S. Cl. ............................ 386/70; 386/45; 386/46; 386/95; 386/96; 386/98; 375/240.01; 375/240.08; 375/240.12

(58) Field of Classification Search .................... 386/96, 386/46, 98, 95, 111, 109, 112, 83, 90, 91, 386/45, 70, 125, 126; 725/48, 51, 63, 68, 725/118; 348/425.1, 726, 391, 392; 380/10, 380/21
See application file for complete search history.

(56) References Cited

U.S. PATENT DOCUMENTS

| | | | | |
|---|---|---|---|---|
| 5,801,781 | A * | 9/1998 | Hiroshima et al. | 348/441 |
| 5,838,873 | A * | 11/1998 | Blatter et al. | 386/95 |
| 6,011,899 | A * | 1/2000 | Ohishi et al. | 386/98 |
| 6,025,006 | A * | 2/2000 | Miller et al. | 426/564 |
| 6,052,506 | A * | 4/2000 | Fukushima et al. | 386/46 |
| 6,052,507 | A * | 4/2000 | Niida et al. | 386/68 |
| 6,091,772 | A * | 7/2000 | Anderson et al. | 375/240.26 |
| 6,404,776 | B1 * | 6/2002 | Voois et al. | 370/468 |
| 6,574,347 | B1 * | 6/2003 | Linse | 381/431 |
| 6,754,239 | B2 * | 6/2004 | Negishi et al. | 370/537 |
| 6,754,347 | B1 * | 6/2004 | Hamada | 380/216 |
| 6,779,195 | B2 * | 8/2004 | Oishi et al. | 725/68 |
| 6,868,125 | B2 * | 3/2005 | Gendel | 375/240.26 |
| 6,888,125 | B2 * | 5/2005 | Ronnekleiv et al. | 250/227.19 |
| 6,929,621 | B2 * | 8/2005 | Whitmore et al. | 604/109 |
| 7,027,718 | B1 * | 4/2006 | Ohishi et al. | 386/98 |
| 7,095,948 | B2 * | 8/2006 | Teunissen | 386/68 |
| 7,096,488 | B1 * | 8/2006 | Zhang et al. | 725/105 |

FOREIGN PATENT DOCUMENTS

| | | |
|---|---|---|
| EP | 0 917 355 A1 | 5/1999 |
| EP | 0 924 931 A2 | 6/1999 |

* cited by examiner

*Primary Examiner*—Thai Tran
*Assistant Examiner*—Jamie J Vent Atala
(74) *Attorney, Agent, or Firm*—Sughrue Mion, PLLC

(57) ABSTRACT

An audio/video data storing and searching apparatus is provided, which stores audio/video data including additional information of a user desired program, to thereby perform an easy searching. For this purpose, the present invention decodes a transport stream (TS) packet and reads additional information with respect to a user desired audio/video packet from program specific information (PSI), and inserts and stores the read result in a particular region of the audio/video packet and parses the additional information to perform a searching. Thus, the audio/video data storing apparatus extracts additional information, inserts the extracted additional information into a particular region, and stores resultant audio/video data. As a result, the audio/video data storing apparatus can reduce a capacity of a storage medium which is used for storing user desired audio/video data. Also, the audio/video data searching apparatus searches the stored audio/video data using additional information included in a particular region, to thereby provide an effect of enhancing a searching speed.

18 Claims, 8 Drawing Sheets

| HEADER INFORMATION (N BITS) | ADDITIONAL INFORMATION HEADER (N0 BITS) | TIME INFORMATION (N1 BITS) | TITLE INFORMATION (N2 BITS) | CONTENT INFORMATION (N3 BITS) | ENERGY INFORMATION (N3 BITS) | MOTION INFORMATION (N3 BITS) | ... |
|---|---|---|---|---|---|---|---|

| PAT PACKET | PMT PACKET | NIT PACKET | DST PACKET | TDT PACKET | EIT PACKET | AUDIO PACKET | VIDEO PACKET |
|---|---|---|---|---|---|---|---|

FIG. 7

| HEADER INFORMATION (N BITS) | ADDITIONAL INFORMATION HEADER (N0 BITS) | TIME INFORMATION (N1 BITS) | TITLE INFORMATION (N2 BITS) | CONTENT INFORMATION (N3 BITS) | ... |

FIG. 8

| HEADER INFORMATION (N BITS) | ADDITIONAL INFORMATION HEADER (N0 BITS) | TIME INFORMATION (N1 BITS) | TITLE INFORMATION (N2 BITS) | CONTENT INFORMATION (N3 BITS) | ENERGY INFORMATION (N3 BITS) | MOTION INFORMATION (N3 BITS) | ... |

APPARATUS FOR STORING AND SEARCHING AUDIO/VIDEO DATA CONTAINING ADDITIONAL INFORMATION

BACKGROUND OF THE INVENTION

1. Field of the Invention

The present invention relates to a digital broadcasting reception system for receiving a digital broadcasting signal and storing and searching the same, and more particularly, to an apparatus for storing and searching audio/video data containing additional information in which a user stores audio/video data of a desired program together with the additional information corresponding to the program, resulting in easy and quick search.

2. Description of the Related Art

According to quick spread of digital media and development of a digital signal processing technology, a digital broadcasting service using a ground wave or a satellite are widely being spread. A general digital broadcasting service is realized on the basis of the MPEG (Moving Picture Experts Group) standard. To perform a digital broadcasting service according to the MPEG standard, program specific information (PSI) such as audio/video information and program information which are compressed with respect to each broadcasting channel is transmitted in the form of a packet of a transport stream (TS). The MPEG TS packet is composed of 188 bytes, among which 4 bytes are header information, and 184 bytes are payload information. The 4-byte header information includes packet identifier (PID) representing what each packet is. Also, the PSI packet transmitted in the form of a TS packet has at least two tables. That is, one is a program map table (PMT) for identifying TS packets of basic streams such as a video stream, an audio stream or a data stream for each program constituting multiplexed programs and the other table is a program association table (PAT) for identifying the PMT. The PAT includes the PID such as a network information table (NIT), a service description table (SDT), a time data table (TDT) and the PMT. The NIT includes the PID such as an event information table (EIT). The SDT includes information with respect to a provider such as broadcasting station information, and the TDT includes information with respect to an absolute time of a broadcast program. The EIT includes information on an electronic program guide (EPG). The EPG information is information with respect to each program such as an edit time, a title, a content and a program classification of a corresponding program. Also, the PMT includes the PID with respect to an audio/video packet of a corresponding program. The audio/video packet exists in the form of a packetized elementary stream (PES) generally, including a bitstream in which audio and video have been compressed. The header portion of the PES includes a clearance space in which user's private data can be inserted. In particular, a user data region is defined in a video bitstream, providing a syntax for allowing user desired information to be inserted thereinto.

In a digital broadcasting service transmitted in the form of a TS packet, a packet including audio/video data of a corresponding program and all TS packets including a PSI packet should be stored in the form of a single program TS packet, in order to store particular audio/video data contained in a particular packet. Also, in order to search the stored audio/video data, a process for decoding a single program TS packet should be performed, which will be described in more detail with reference to FIGS. 1 and 2.

FIG. 1A is a block diagram showing a general storage device for storing audio/video data. FIG. 1B shows a pattern of a single program TS packet.

In FIG. 1A, a TS decoder 11 receives a TS packet and classifies the received TS packet into various PSI packets such as a PAT, PMT, NIT and EIT. The classified PSI packet is stored in a storage medium 16 under the control of a controller 15. Also, the TS decoder 11 extracts a corresponding audio/video packet from the input TS packet, using PID information of the audio/video packet with respect to a user desired particular program. The extracted audio/video packet is supplied to an audio/video packet processor 12. If the audio/video packet has been encrypted, the audio/video packet processor 12 decrypts the supplied audio/video packet using a decryptor 13, so as to be stored in a storage medium 16. The controller 15 reads the PSI packet stored in the storage medium 16 and a user selected audio/video packet so as to be output to a single program TS producer 14. The single program TS producer 14 produces a single program TS packet as shown in FIG. 1B, using the audio/video packet of the user selected program and the PSI packet, which are input via the controller 15, and stores the same in the storage medium 16 again. Referring to FIG. 1B, the single program TS packet includes all packets necessary for watching a user desired program. That is, the single program TS packet includes all PSI packets such as PAT, PMT, NIT, SDT, TDT and EIT packets necessary for a corresponding audio/video packet as well as an audio packet and a video packet.

FIG. 2 shows a general searching apparatus for searching audio/video data in which a stored single program TS packet is searched to allow a user to watch his or her desired program.

In FIG. 2, a PAT parser 111 in a single program TS decoder 110 receives a single program TS packet and searches a PAT packet. The PAT parser 111 detects PID information representing position of a PSI packet such as a PMT, SDT, TDT and NIT, and outputs each packet to each parser 112, 113, 114 or 115. The PMT parser 112 parses the PID information of the PMT packet input from the PAT parser 111 and outputs an audio/video packet to an audio/video decoder 17. Meanwhile, the NIT parser 113 extracts PID information of the EIT packet from the NIT packet and outputs the EIT packet to an EIT parser 116. The EIT parser 116, the SDT parser 114, and the TDT parser 115 read data of each packet according to the PID information of the parsed packet and outputs the read data to a search information comparator 18. The search information comparator 18 compares data of each packet supplied from each parser 114, 115 or 116 with user input search information. Here, the search information includes a title, a content and a time of a user desired program. The search information comparator 18 outputs the comparison result to an audio/video decoder 17, in the case that data of each packet is coincident with user desired search information. Then, the audio/video decoder 17 decodes a currently input audio/video packet and outputs the decoded result.

However, the above prior art requires a storage medium of a large capacity, since a PSI packet should be also stored in addition to an audio/video packet including audio/video data. Also, since data of the PSI packet stored together with the audio/video packet should be parsed in order to allow a user to search the stored audio/video packet and to watch a user desired program, a long searching time is consumed.

SUMMARY OF THE INVENTION

To solve the above problems, it is an object of the present invention to provide an apparatus for storing and searching audio/video data including additional information, in which a transport stream (TS) packet is decoded and the additional information with respect to a user desired audio/video packet from a program specific information (PSI) packet is read, and then the additional information is inserted and stored into a particular region of the audio/video packet to thereafter be parsed and searched.

To accomplish the above object of the present invention, there is provided an apparatus for storing audio/video data including additional information, the audio/video data storing apparatus comprising: a packet parser for extracting packet identification information from a program specific information (PSI) packet and outputting additional information corresponding to the extracted packet identification information and an audio and/or video packet;

an audio/video parser for parsing an audio and/or video packet using the packet identification information and outputting an audio and/or video packet; an audio/video producer for inserting the additional information supplied from the packet parser into a particular region in the audio and/or video packet supplied from the audio/video parser; a storage medium; and a controller for controlling each element so that the additional information is inserted into the audio and/or video packet so as to be stored in the storage medium.

According to another aspect of the present invention, there is also provided an apparatus for searching audio/video data including additional information, the audio/video data searching apparatus comprising: an input portion for receiving an audio and/or video packet including additional information; an additional information classifier for parsing the audio and/or video packet supplied from the input portion and extracting and outputting the additional information, and then outputting the audio and/or video packet excepting for the additional information; an additional information parser comparing the additional information received from the additional information classifier with user search information and outputting a parsed result with respect to whether or not the search information is included in the additional information; an audio/video decoder for decoding an audio and/or video packet supplied from the additional information classifier according to the parsed result supplied from the additional information parser; and an output portion for outputting a decoded result supplied from the audio/video decoder and the additional information.

BRIEF DESCRIPTION OF THE DRAWINGS

The above object and other advantages of the present invention will become more apparent by describing the preferred embodiment thereof in more detail with reference to the accompanying drawings in which:

FIG. 7 shows an example of additional information according to the present invention; and FIG. 8 shows another example of additional information according to the present invention.

DETAILED DESCRIPTION OF THE INVENTION

Preferred embodiments of the present invention will be described with reference to the accompanying drawings.

Figures 1A, 1B:
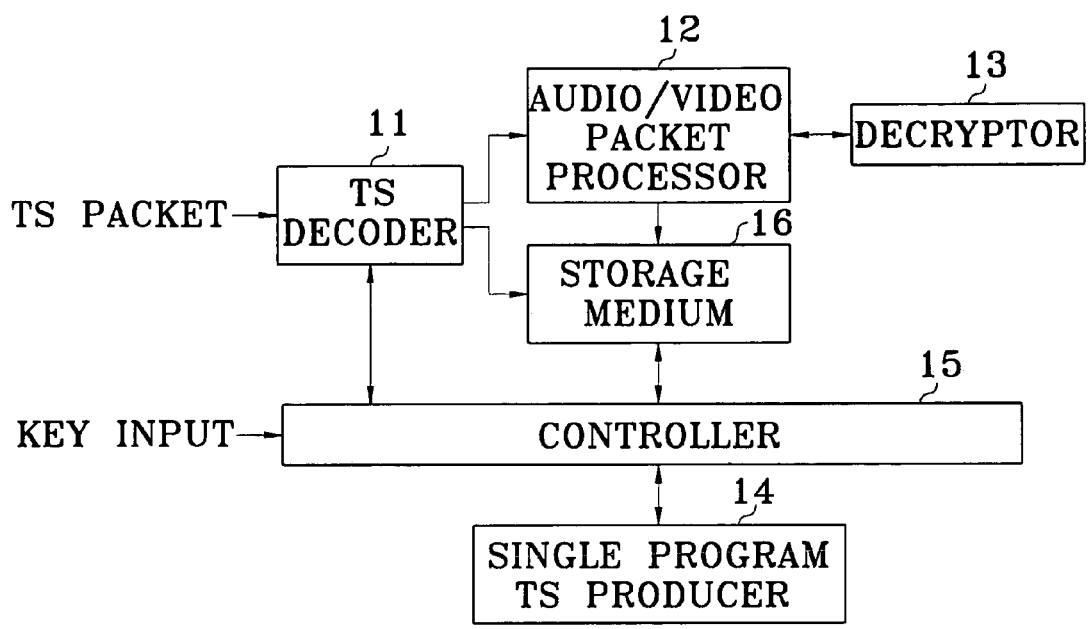
FIG. 1A is a block diagram showing a general storage apparatus for storing audio/video data.
FIG. 1B shows the pattern of a single program TS packet.
Figure 2:
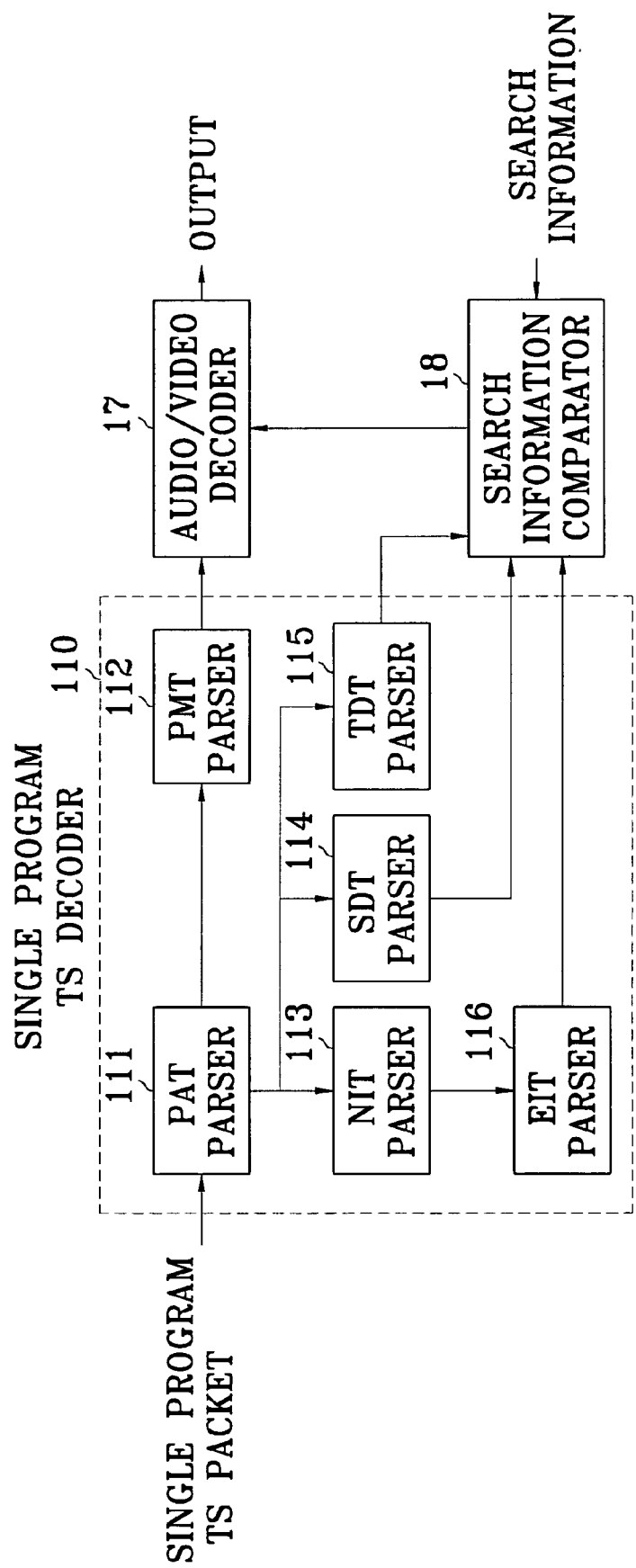
FIG. 2 is a block diagram showing a general search apparatus for searching audio/video data.
Figure 3:
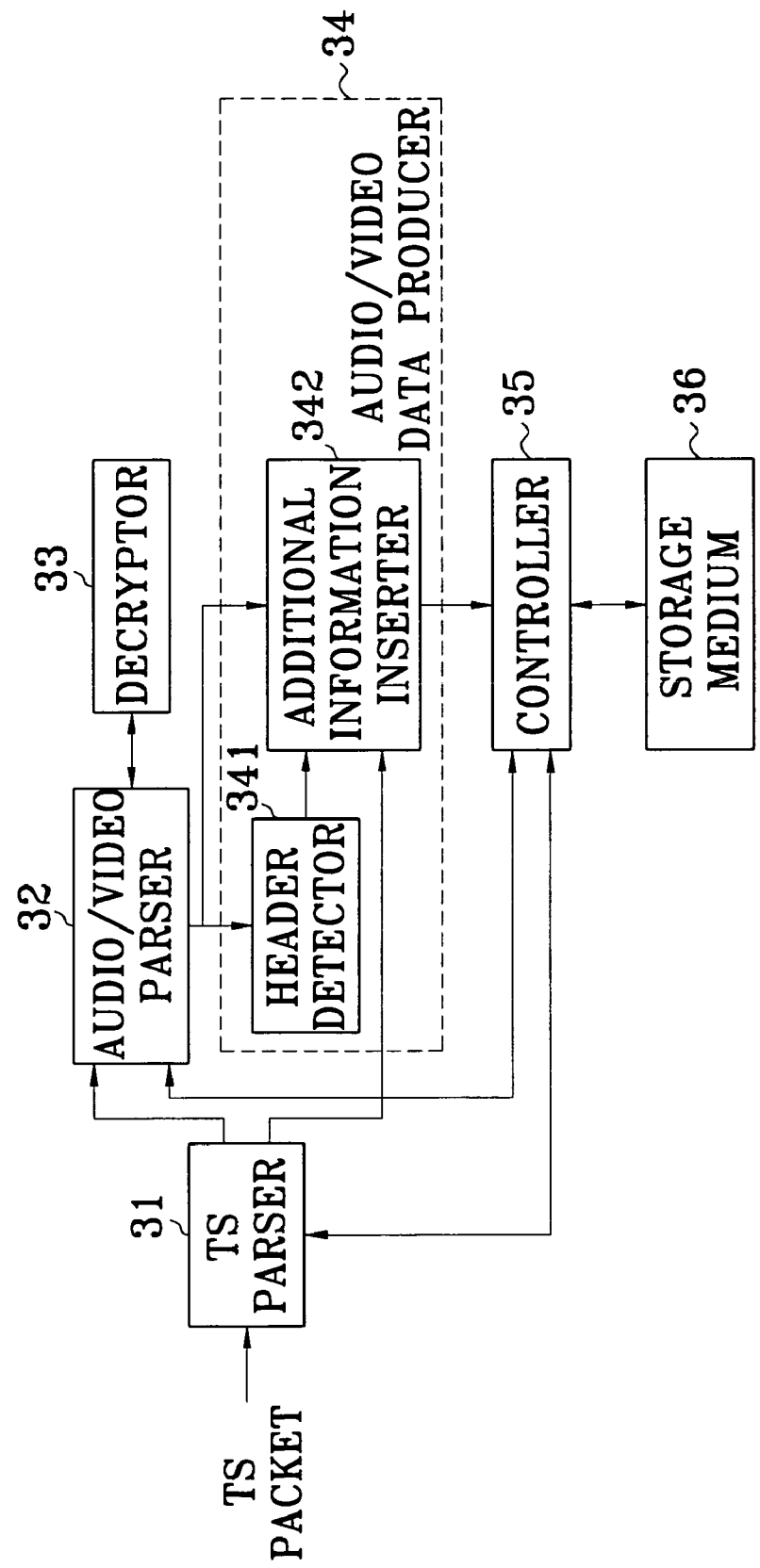
FIG. 3 is a block diagram showing an apparatus for storing audio/video data including additional information according to an embodiment of the present invention.

In FIG. 3, an apparatus for storing audio/video data including additional information according to an embodiment of the present invention, includes a TS parser 31 for parsing a received TS packet, an audio/video parser 32 for parsing an audio/video packet resulting from the parsing of the TS packet, and a decryptor 33 connected to the audio/video parser 32, for decrypting an audio/video packet. An audio/video data producer 34 connected between the TS parser 31 and the audio/video parser 32 includes a header detector 341 for detecting a header region from an input audio/video packet and an additional information inserter 342 for inserting the additional information resulting from the parsed result of the TS packet into the detected header region, to thereby produce new audio/video data. The FIG. 3 apparatus also includes a controller 35 for controlling the operation of each element so that audio/video data including the additional information is stored in the storage medium 36.

The operation of the storage apparatus for storing the audio/video data including the additional information of FIG. 3 having the above constitution will be described below with reference to FIG. 4.

Figure 4:
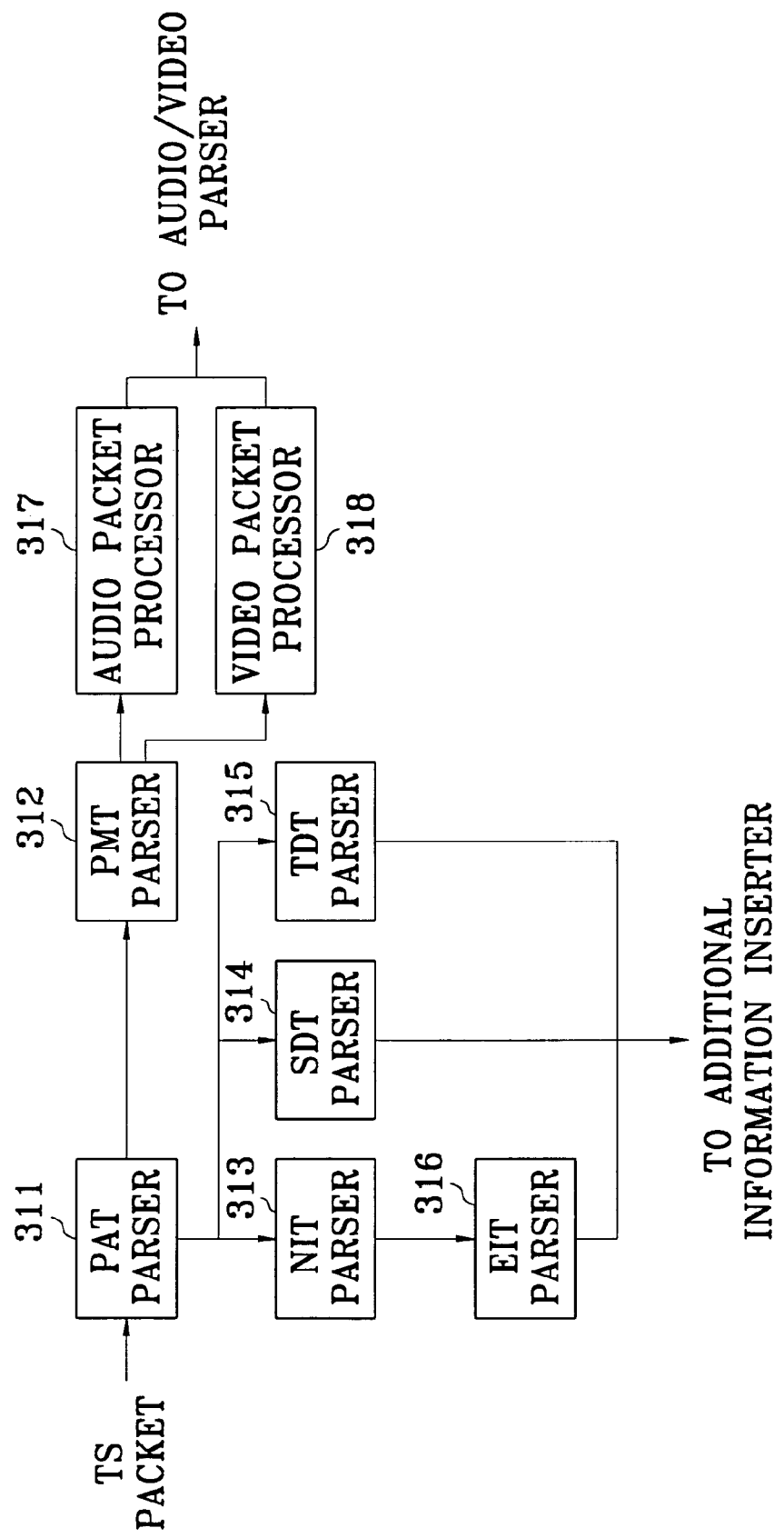
FIG. 4 is a block diagram showing the TS parser in the FIG. 3 apparatus in detail.

FIG. 4 is a block diagram showing the TS parser 31 in the FIG. 3 apparatus in detail. The TS parser 31 includes a PAT parser 311, a PMT parser 312, a NIT parser 313, a SDT parser 314 and a TDT parser 315. An EIT parser 316 is connected to the NIT parser 313. An audio packet parser 317 and a video packet processor 318 are connected to the PMT parser 312.

The PAT parser 311 in the TS parser 31 receives a TS packet to search a PAT packet. The PAT parser 311 detects PID information representing position of a PSI packet such as a PMT, SDT, TDT and NIT, and outputs each packet to each parser 312, 313, 314 or 315. The PMT parser 312 parses the PID information of the PMT packet input from the PAT parser 311 and outputs a corresponding audio/video packet to an audio packet processor 317 and a video packet processor 318, respectively. The audio packet processor 317 converts an audio packet into a packet elementary stream (PES) or an elementary stream (ES), and likewise the video packet processor 318 converts a video packet into a PES or ES, to then output the converted result to an audio/video parser 32. Hereinafter, an example in which the video packet is converted into a PES will be described.

Meanwhile, the NIT parser 313 extracts PID information representing position of the EIT packet from the NIT packet and outputs the EIT packet to an EIT parser 316. The EIT parser 316, the SDT parser 314, and the TDT parser 315 parses each packet and outputs the additional information. Here, the additional information includes a title, classification code and time of audio/video data of a user desired program, which includes image feature information such as content information, energy information and motion information. Referring to FIGS. 7 and 8, the additional information will be described later. The produced additional information as described above is output to the additional information inserter 342.

In FIG. 3, the audio/video parser 32 parses the input audio/video packet which has been converted into a PES in the TS parser 31, using the PID information. Here, the audio/video parser 32 decrypts the input audio/video packet using a decryptor 33 in the case that the input audio/video packet has been encrypted, and then outputs the decrypted result to the header detector 341 and the additional information inserter 342. The header detector 341 receives the decrypted audio/video packet and parses a syntax, to thereby detect a PES header or a header with respect to user data to then be output to the additional information inserter 342. In the case of an ES, a user header is inserted into a region where user data can be inserted.

Meanwhile, the additional information inserter 342 inserts the additional information input from the TS parser 31 into a PES header region or a user data region of the audio/video packet decrypted in the audio/video parser 32 and outputs the inserted result to the controller 35. The controller 35 controls the storage medium 36 to store the audio/video packet in which the additional information has been inserted.

Figure 5:
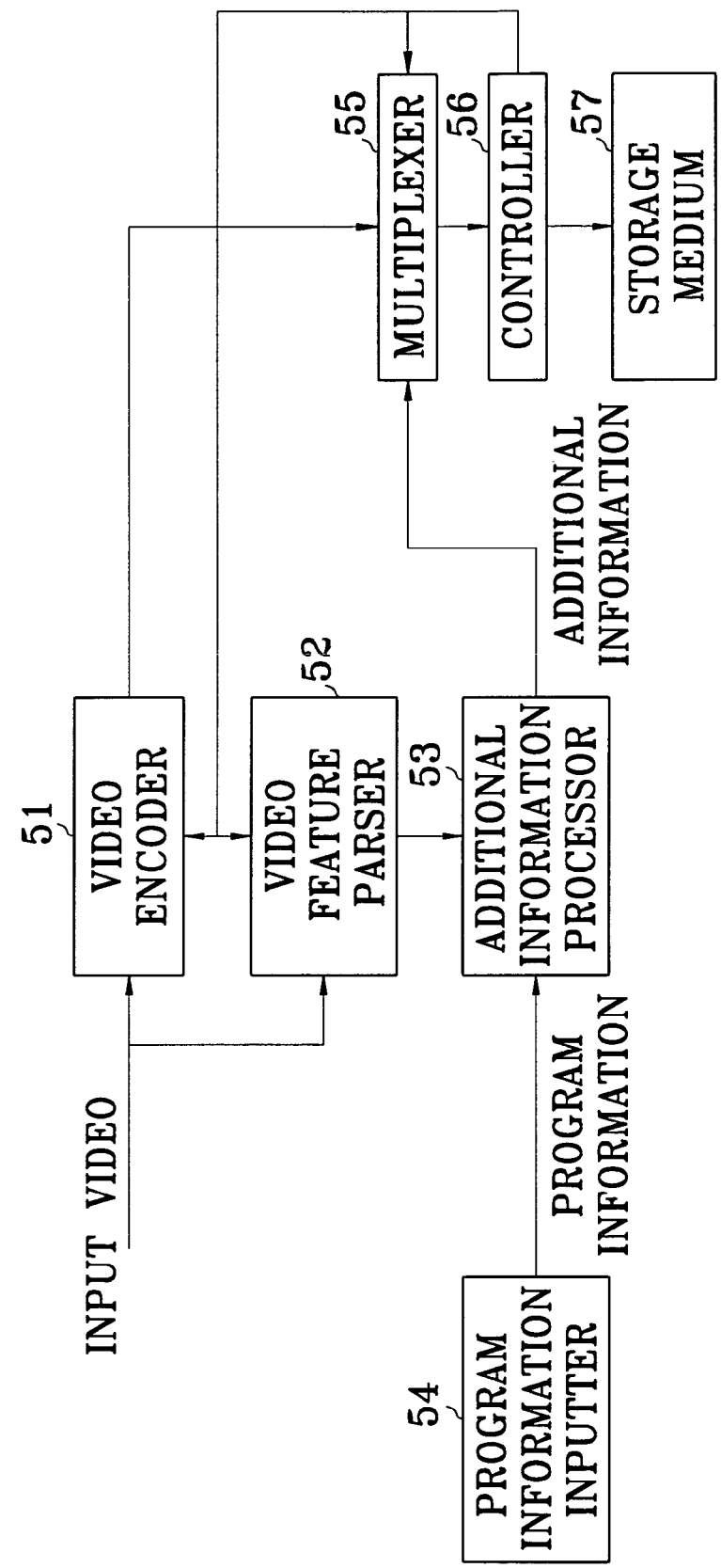
FIG. 5 is a block diagram showing an apparatus for storing audio/video data including additional information according to another embodiment of the present invention.

FIG. 5 is a block diagram showing an apparatus for storing audio/video data including additional information according to another embodiment of the present invention, in which only a video signal feature is parsed and user desired program information is inserted into the parsed result, to then be stored.

The FIG. 5 apparatus includes a video encoder 51 for receiving a video signal and a video feature parser 52. Also, the FIG. 5 apparatus includes a program information inputter 54 for receiving a user desired program information and an additional information processor 53 connected to the program information inputter 54. The FIG. 5 apparatus also includes a multiplexer 55 connected to the video encoder 51 and the additional information processor 53, a controller 56 for controlling each element and a storage medium 57.

In FIG. 5, the video encoder 51 compresses an input video signal to produce a video bitstream, and outputs a video packet converted into a PES to the video feature parser 52 and the multiplexer 55. The video feature parser 52 extracts a parameter which can represent a feature of the input video signal. Here, the parameter is an energy of the input video signal or motion information thereof. Meanwhile, the program information inputter 54 receives user desired program information to then be output to the additional information processor 53. Here, the program information includes a title, a classification code and a time of a corresponding program. The additional information processor 53 receives the program information input from the program information inputter 54 and the parameter extracted from the video feature parser 52, and disposes the received program information and parameter so as to match a syntax and outputs the additional information to the multiplexer 55. Here, the additional information includes a title, a classification code and a time of a user desired program, which is image feature information such as content information, energy information and motion information. The additional information will be described below with reference to FIGS. 7 and 8. The multiplexer 55 inserts the additional information input from the additional information processor 53 into a PES header region or user data region of the video packet input from the video encoder 51. In the case of an ES, a header with respect to a user is inserted into a region where user data can be inserted. The controller 56 stores the video packet in which the additional information has been inserted, in the storage medium 57.

Figure 6:
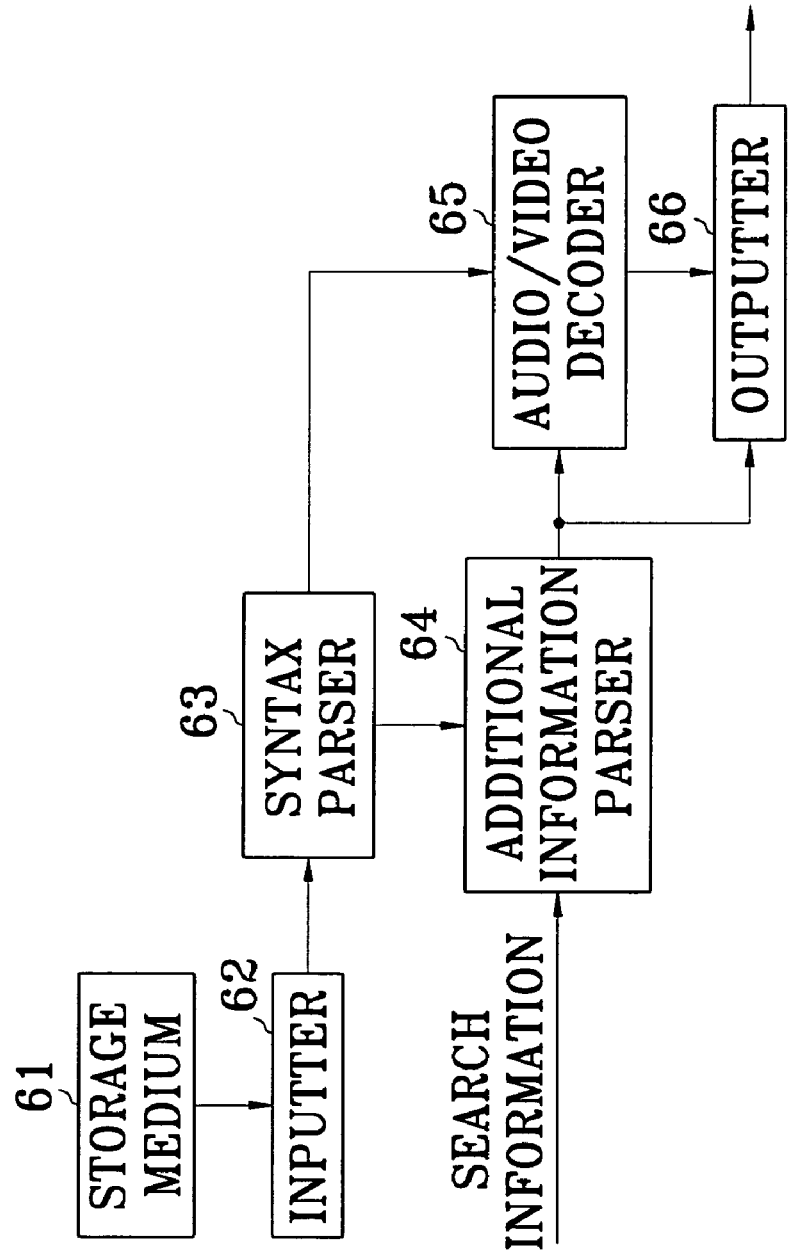
FIG. 6 is a block diagram showing an apparatus for searching audio/video data including additional information which is stored in FIG. 3.

FIG. 6 is a block diagram showing an apparatus for searching audio/video data including additional information which is stored in FIG. 3. Also, the FIG. 6 apparatus can be applied to a video packet including additional information stored in FIG. 5.

The FIG. 6 apparatus includes a storage medium 61 storing an audio/video packet including additional information, an inputter 62 for receiving the audio/video packet, a syntax parser 63 for parsing a syntax of the packet and detecting additional information, an additional information parser 64 for receiving the additional information detected in the syntax parser 63 and the search information, an audio/video decoder 65 for decoding the audio/video packet received from the syntax parser 63, and an outputter 66 for outputting the decoded result and the additional information parsed result.

In FIG. 6, the storage medium 61 outputs an audio/video packet. The inputter 62 receives the audio/video packet from the storage medium 61 and outputs the same to the syntax parser 63. The syntax parser 63 parses the syntax of the audio/video packet of the PES and detects the additional information of the PES header or user data region. The syntax parser 63 outputs the detected additional information to the additional information parser 64 and the audio/video packet except for the additional information to the audio/video decoder 65. The additional information parser 64 compares the input additional information with the user input search information. Here, the search information includes a title, a classification code and a time of a user desired program. Then, in the case that the search information is coincident with the additional information, the additional information parser 64 outputs the comparison result to the audio/video decoder 65. Then, the audio/video decoder 65 decodes the audio/video packet supplied from the syntax parser 63 and outputs the decoded result to the outputter 66. The outputter 66 outputs the audio/video decoded result supplied from the syntax parser 63 and the additional information parsed result supplied from the additional information parser 64. Here, the additional information includes a title, a classification code and a time of the audio/video data of a user desired program, which represents image feature information such as content information, energy information and motion information, which will be described with reference to FIGS. 7 and 8.

FIG. 7 shows an example of additional information according to the present invention, in which additional information is added in a user data region. The user data header information is a header representing that following data is user data, which is represented with N bits. The additional information header is a header representing that following data includes additional information, which is represented with N0 bits. The time information represents a time of a recorder or producer for corresponding audio/video data, which is represented with N1 bits. Also, the title information represents a title of corresponding audio/video data, which is represented with N2 bits. Also, the content information represents a content of audio/video data, which is represented with N3 bits. The content information also includes a key word which can represent a content of corresponding audio/video data. FIG. 8 shows another example of additional information according to the present invention, in which energy information representing a complexity of an image and motion information representing a degree of motion.

Thus, the present invention extracts additional information, inserts the extracted additional information into a particular region, and stores resultant audio/video data. As a result, the present invention can reduce a capacity of a storage medium which is used for storing user desired audio/video data. Also, the present invention searches the stored audio/video data using additional information included in a particular region, to thereby provide an effect of enhancing a searching speed.

What is claimed is:

1. Apparatus for storing audio and/or video (AV) data which is transmitted in the form of a packet including a program specific information (PSI), the apparatus comprising:
- a packet parser that parses a received transport stream (TS) packet to output at least one PSI packet and an AV packet corresponding to the at least one PSI packet, extracts packet identifier information (PID) from the at least one PSI packet, and extracts additional information, corresponding to the PID, from the at least one PSI packet, wherein the additional information does not include the PID;
- an AV parser that parses and outputs the AV packet using the PID;
- an AV producer that inserts the additional information extracted at the packet parser into a particular region in the AV packet output from the AV parser;
- a storage medium; and
- a controller that controls the AV producer and the storage medium such that the additional information is inserted into the AV packet and the AV packet in which the additional information is inserted is stored in the storage medium as the AV data corresponding to the AV packet and the at least one PSI packet,
- wherein the at least one PSI packet is not stored in the storage medium.

2. The apparatus of claim 1, wherein the packet parser comprises:
- a program association table (PAT) parser that searches a PAT packet to detect PID of a plurality of tables included in the received TS packet and outputs a detected result as a plurality of table packets;
- a program map table (PMT) parser that detects the AV packet using a table packet which is a PMT table and outputs the AV packet;
- a plurality of table parsers that output the additional information from the plurality of table packets; and
- an AV packet processor that converts a pattern of the AV packet output from the PMT parser and outputs a converted result.

3. The apparatus of claim 2, wherein the plurality of table parsers comprises:
- a network information table (NIT) parser that receives an NIT packet from the PAT parser and outputs an event information table (EIT) packet;
- an EIT parser that receives the EIT packet from the NIT parser and outputs a portion of the additional information;
- a service description table (SDT) parser that receives an SDT packet from the PAT parser and outputs another portion of the additional information; and
- a time data table (TDT) parser that receives a TDT packet from the PAT parser and outputs a remaining portion of the additional information.

4. The apparatus of claim 2, wherein the AV packet processor converts the AV packet into a packetized elementary stream (PES).

5. The apparatus of claim 1, wherein the AV parser further comprises a decryptor that decrypts the AV packet if the AV packet output from the packet parser is encrypted.

6. The apparatus of claim 1, wherein the AV producer comprises:
- a header detector that detects a header region in the AV packet from the AV parser and outputs a detected result; and
- an additional information inserter that inserts the additional information output from the packet parser into the header region detected by the header detector.

7. The apparatus of claim 4, wherein the particular region is a header region of the PES.

8. The apparatus of claim 4, wherein the particular region is a user data region of the PES.

9. The apparatus of claim 1, wherein the additional information is image feature information comprising a title, a classification code, a time, content information, energy information and motion information of a user desired program.

10. An apparatus for storing received audio and/or video (AV) data, the apparatus comprising:
- an encoder that converts the received AV data into an AV packet and outputs the AV packet;
- a feature parser that parses a feature of the received AV data and outputs a parameter corresponding to the parsed feature;
- a program information inputter that receives and outputs user desired program information input by a user;
- an additional information processor that produces additional information based on the program information output from the program information inputter and the parameter output from the feature parser, and outputs the additional information;
- an AV producer that inserts the additional information output from the additional information processor into a particular region of the AV packet output from the encoder, the additional information not including packet identifier information (PID) contained in a program specific information (PSI) packet which is included in the received AV data and corresponds to the AV packet;
- a storage medium; and
- a controller that controls the storage medium to store the video packet in which the additional information is inserted,
- wherein the PSI packet is not stored in the storage medium.

11. The apparatus of claim 10, wherein the encoder converts the AV data into a packetized elementary stream (PES).

12. The apparatus of claim 11, wherein the particular region is a header region of the PES.

13. The apparatus of claim 11, wherein the particular region is a user data region of the PES.

14. The apparatus of claim 11, wherein the additional information comprises the user desired program information comprising a title, a classification code and a time of the user desired program, and corresponding to content information, energy information and motion information of the received AV data.

15. An apparatus for searching audio and/or video (AV) data having a form of an AV packet, including additional information of a user desired program, the apparatus comprising:
- an input portion that receives and outputs the AV packet including the additional information;
- a syntax parser that parses the AV packet output from the input portion, extracts and outputs the additional information inserted in a packetized elementary stream (PES) header or a user date region of the AV packet, and outputs the AV packet from which the additional information is extracted;
- an additional information parser that compares the additional information output from the syntax parser with user search information, and outputs a parsed result when the user search information is coincident with the additional information;

an AV decoder that decodes the AV packet output from the syntax parser according to the parsed result output from the additional information parser; and an output portion that outputs a decoded result output from the AV decoder and the additional information, thereby searching the AV data, wherein the additional information is extracted from at least one program specific information (PSI) packet using packet identifier information (PID) of the at least one PSI packet, wherein the additional information does not include the PID of the at least one PSI packet, and wherein the at least one PSI packet include information of the AV data, and is not used in searching the AV data.

16. The apparatus of claim 15, wherein the additional information comprises the user desired program information comprising a title, a classification code and a time of the user desired program, and corresponding to content information, energy information and motion information of the received video data.

17. The apparatus of claim 1, wherein the additional information includes information included in the at least one PSI packet, and the additional information is smaller than the at least one PSI packet in size.

18. The apparatus of claim 15, wherein the additional information includes information included in the at least one PSI packet, and the additional information is smaller than the at least one PSI packet in size.

* * * * *

UNITED STATES PATENT AND TRADEMARK OFFICE
CERTIFICATE OF CORRECTION

| | | |
|---|---|---|
| PATENT NO. | : 7,603,024 B1 | Page 1 of 1 |
| APPLICATION NO. | : 09/706814 | |
| DATED | : October 13, 2009 | |
| INVENTOR(S) | : Kang-Wook Chun | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1680 days.

Signed and Sealed this

Fifth Day of October, 2010

David J. Kappos
*Director of the United States Patent and Trademark Office*

(12) EX PARTE REEXAMINATION CERTIFICATE (9277th)
United States Patent
Chun

(10) Number: US 7,603,024 C1
(45) Certificate Issued: Sep. 4, 2012

(54) APPARATUS FOR STORING AND SEARCHING AUDIO/VIDEO DATA CONTAINING ADDITIONAL INFORMATION

(75) Inventor: Kang-Wook Chun, Suwon (KR)

(73) Assignee: Samsung Electronics Co., Ltd., Suwon (KR)

Reexamination Request:
No. 90/011,137, Sep. 7, 2010

Reexamination Certificate for:
Patent No.: 7,603,024
Issued: Oct. 13, 2009
Appl. No.: 09/706,814
Filed: Nov. 7, 2000

Certificate of Correction issued Oct. 5, 2010.

(30) Foreign Application Priority Data

Nov. 20, 1999 (KR) ........................ 1999-51711

(51) Int. Cl.
*H04N 5/91* (2006.01)
*H04N 7/12* (2006.01)

(52) U.S. Cl. ................ 386/70; 375/240.01; 375/240.08; 375/240.12; 386/45; 386/46; 386/95; 386/96; 386/98

(58) Field of Classification Search ........................ None
See application file for complete search history.

(56) References Cited

To view the complete listing of prior art documents cited during the proceeding for Reexamination Control Number 90/011,137, please refer to the USPTO's public Patent Application Information Retrieval (PAIR) system under the Display References tab.

*Primary Examiner* — Joseph R. Pokrzywa

(57) ABSTRACT

An audio/video data storing and searching apparatus is provided, which stores audio/video data including additional information of a user desired program, to thereby perform an easy searching. For this purpose, the present invention decodes a transport stream (TS) packet and reads additional information with respect to a user desired audio/video packet from program specific information (PSI), and inserts and stores the read result in a particular region of the audio/video packet and parses the additional information to perform a searching. Thus, the audio/video data sorting apparatus extracts additional information, inserts the extracted additional information into a particular region, and stores resultant audio/video data. As a result, the audio/video data storing apparatus can reduce a capacity of a storage medium which is used for storing user desired audio/video data. Also, the audio/video data searching apparatus searches the stored audio/video data using additional information included in a particular region, to thereby provide an effect of enhancing a searching speed.

| HEADER INFORMATION (N BITS) | ADDITIONAL INFORMATION HEADER (N0 BITS) | TIME INFORMATION (N1 BITS) | TITLE INFORMATION (N2 BITS) | CONTENT INFORMATION (N3 BITS) | ENERGY INFORMATION (N3 BITS) | MOTION INFORMATION (N3 BITS) | ••• |

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 10-16 and 18 is confirmed.

Claims 1-9 and 17 are cancelled.

\* \* \* \* \*